G. S. GUNDERSEN.

PLANT TRANSPLANTING MACHINE.

No. 11,262. Reissued Aug. 16, 1892.

Witnesses

Severance.

Ralph Daskam.

Inventor

Gilbert S. Gundersen

By John Wedderburn his Attorney

UNITED STATES PATENT OFFICE.

GILBERT S. GUNDERSEN, OF BELOIT, WISCONSIN.

PLANT-TRANSPLANTING MACHINE.

SPECIFICATION forming part of Reissued Letters Patent No. 11,262, dated August 16, 1892.

Original No. 463,190, dated November 17, 1891. Application for reissue filed May 21, 1892. Serial No. 433,927.

*To all whom it may concern:*

Be it known that I, GILBERT S. GUNDERSEN, a citizen of the United States, residing at Beloit, in the county of Rock and State of Wisconsin, have invented certain new and useful Improvements in Plant-Transplanting Machines, of which the following is a specifition.

The object of this invention is to construct a machine for transplanting tobacco-plants, cabbage-plants, tomato-plants, &c., and which consists of the revolving wheel provided with tubular radial arms connected to a central hub which has a communication with a water-reservoir. Means are provided whereby a supply of water is automatically discharged through each arm as in its revolution it comes into its lowest vertical position, and packers are so located as to press the earth around the plant.

Figure 1:
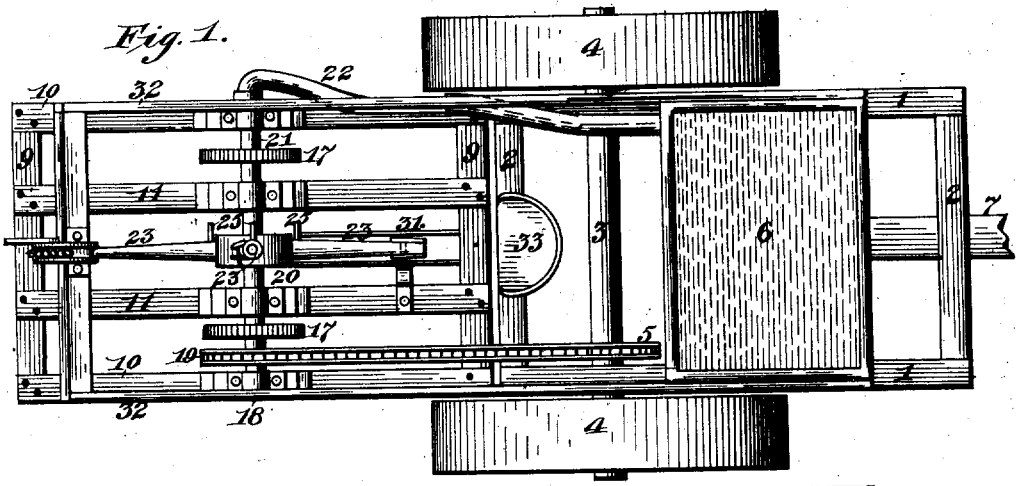
Figure 2:
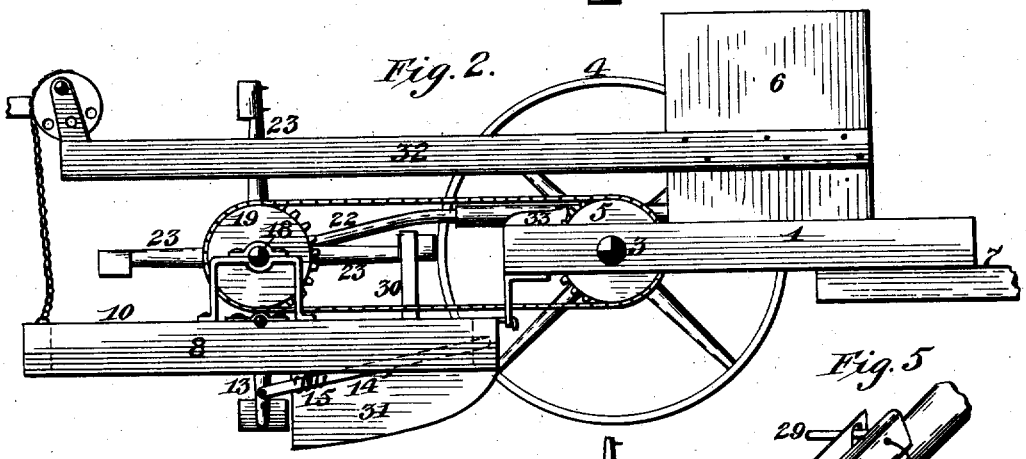
Figure 5:
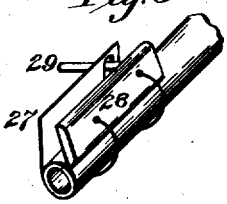
Figure 6:
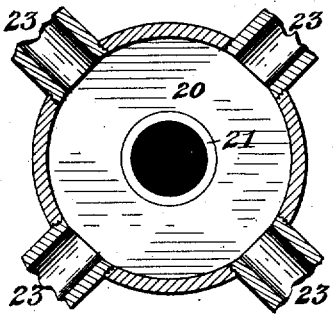
Figure 3:
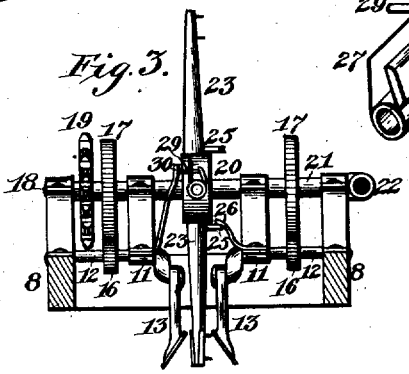
Figure 4:
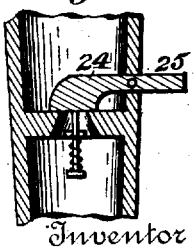

In the drawings, Figure 1 is a top plan view; Fig. 2, a side view. Figs. 3, 4, 5, and 6 are views of the details of construction of the machine.

My improved machine consists of a front and rear section, the front section consisting of side beams 1, held suitably separated by end beams 2. Near the rear end of the front section is supported an axle 3, upon the ends of which are located carrying-wheels 4. A sprocket-wheel 5 is also connected with this axle inside of the framework. A water-reservoir 6 is located on the front section, forward of the carrying-wheels, and a tongue 7 projects from the forward end of the frame. The rear section consists of side beams 8, held suitably separated by end bars 9. Upon the upper surface of the side bars is secured a metallic strip 10 of the same width as the side bars. Inside of the side bars are secured metallic strips 11, which connect with the end bars. Upon the upper surface of the side bars 8 and metallic strip 10, about midway of their length, are secured double bearings, the upper bearings supporting a revolving water-wheel, which will hereinafter be more fully described. The lower bearings support short shafts 12, which have their inner ends in crank form, from which depend packer-arms 13, which are made of plate material, having their outer edges lower than their inner edges. Just above these packer-plates is connected a two-part arm 14, which has a pivotal connection with the forward cross-bar of the rear section. A spring 15 connects the two parts of the arm 14 in such manner as to allow the packers a rearward yielding movement. A tooth-pinion 16 is connected to each of the short shafts, which meshes with a larger tooth-wheel 17, connected to the shaft supported in the upper bearings, and from which motion is imparted to the crank-arms.

The upper shaft consists of two sections, the section 18 being a solid shaft, upon which is mounted a sprocket-wheel 19, which has a chain-belt connection with the sprocket-wheel 5, mounted on the axle of the carrying-wheels, through the medium of which power is transmitted to turn the various parts of my device. The shaft 18 is connected to a central tubular hub 20, and a section 21 of pipe also connects with this hub, the outer end of which has connection with a hose 22, which is connected to the water-supply tanks. From this central hub radiate four tubular arms 23, in each of which, near the hub, is located a valve 24, which has a lateral projecting arm 25, which comes in contact with a strip 26, secured to the main frame, and which it engages when the tubes stand in a vertical position. Near the outer end of each of these tubular arms is secured a clamp for holding the plants to be transplanted, and consists of a stationary metallic strip 27 and a movable spring-actuated bar 28. To this spring-actuated bar is connected a short arm 29, which when the arms assume a horizontal position forward of their center will engage a bar 30, which will force the spring-bar open to allow the deposit of the plant and will immediately close upon the plants when the arm 29 passes from the plate 30. To the rear section, near its forward end, is secured a furrow-opener 31, which has its upper edge opened and its rear end wider than its front end. The rear end of this furrow-opener extends nearly under the vertical center of the water-supply pipes. To the forward section are connected lengthwise bars 32, which extend to the rear end of the rear section, and a raising-lever has a connection with the rear end of the rear section, by means of which the rear section may be raised for transportation and in turning corners by reason of the hinge-joint connection between the two sections. An operator's seat 33 is supported by the front section, and is located near the water-supply pipes to enable the operator to place the plants in the free ends of the water-tubes.

When my machine is in operation, the rear section will be lowered and conform to the unevenness of the ground, and will be supported wholly by the furrow-opener. As the machine is drawn forward, a rotary motion is imparted to the water-pipes and a reciprocating movement to the packer-arms. As the water-pipes revolve, the operator will place a plant in the clamp secured by the free end of each of the water-pipes. The pipe in its revolutions forward will carry the plant downward, and when it is in a vertical position it will be in the furrow made by the furrow-opener, and when it has reach its position the valves in the pipes will be open, allowing the escape of sufficient water to insure the life of the plant. The packer-arms will then descend and press the earth firmly around the roots of the plant, holding it firmly in an upright position. The tension of the clamp for holding the plant is just sufficient to set the plant in position, and the tubes after depositing the plant in the ground will move away from the plant, leaving it in a standing position. This operation will be repeated at the deposit of each plant.

I claim as my invention—

1. In a transplanting-machine consisting of a rear and front section having a hinge-joint connection, the front section supported upon carrying-wheels and carrying a water-tank, the rear section carrying a furrow-opener, and the plant carrying and watering devices, and a connection between the water-tank and watering device.

2. In a transplanting-machine, the combination of a shaft, a crank on one end thereof, an arm working on a crank-pin at the end of said crank, and an oblique packer-plate at the end of said arm, substantially as described.

3. In a transplanting-machine, the combination, with a packer-arm, of a yielding and resilient connection between said packer-arm and the frame of the machine, substantially as described.

4. In a transplanting-machine, the combination, with a packer-arm, of a two-part arm, one end whereof is pivotally connected to the packer-arm and the other to the frame of the machine, and a spring or yielding connection between the two parts of said arm, substantially as described.

5. In a transplanting-machine, the combination of a revolving tubular arm, jaws at the end of said arm adapted to hold the plant, and a spring adapted to close said jaws upon the plant, substantially as described.

6. In a transplanting-machine, the combination of a revolving tubular arm, jaws at the end of said arm adapted to hold the plant, a spring adapted to close said jaws upon the plant, and means for automatically opening said jaws at the proper position of the revolving arm, substantially as described.

7. In a transplanting-machine, the combination, with the tank and hollow hub and water-pipe connection, of a revolving tubular arm adapted to convey water to the plant, a spring-operated device for closing the supply of water, and means for automatically opening said supply against said spring at the proper position of the revolving arm, substantially as described.

In testimony whereof I have signed this specification in the presence of the subscribing witnesses.

GILBERT S. GUNDERSEN.

Witnesses:
O. H. ORTON,
J. N. HUGHES.